(12) United States Patent
Bocchieri et al.

(10) Patent No.: US 9,373,326 B2
(45) Date of Patent: Jun. 21, 2016

(54) SYSTEM AND METHOD FOR COMBINING GEOGRAPHIC METADATA IN AUTOMATIC SPEECH RECOGNITION LANGUAGE AND ACOUSTIC MODELS

(71) Applicant: AT&T Intellectual Property I, L.P., Atlanta, GA (US)

(72) Inventors: Enrico Bocchieri, Chatham, NJ (US); Diamantino Antonio Caseiro, Philadelphia, PA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 14/541,738

(22) Filed: Nov. 14, 2014

(65) Prior Publication Data

US 2015/0073793 A1  Mar. 12, 2015

Related U.S. Application Data

(63) Continuation of application No. 12/638,667, filed on Dec. 15, 2009, now Pat. No. 8,892,443.

(51) Int. Cl.

| | |
|---|---|
| *G10L 15/19* | (2013.01) |
| *G10L 15/08* | (2006.01) |
| *G06F 17/28* | (2006.01) |
| *G10L 15/197* | (2013.01) |
| *G10L 25/54* | (2013.01) |

(52) U.S. Cl.
CPC .............. *G10L 15/08* (2013.01); *G06F 17/289* (2013.01); *G10L 15/197* (2013.01); *G10L 25/54* (2013.01); *G10L 15/19* (2013.01); *G10L 2015/081* (2013.01)

(58) Field of Classification Search
CPC ..... G10L 17/22; G10L 15/265; H04M 3/4931
USPC .......................................................... 704/270
See application file for complete search history.

(56) References Cited

U.S. PATENT DOCUMENTS

| | | |
|---|---|---|
| 5,509,049 A | 4/1996 | Peterson |
| 5,893,032 A | 4/1999 | Maeda et al. |
| 5,943,417 A | 8/1999 | Cox et al. |
| 5,995,929 A | 11/1999 | Gupta |
| 6,243,684 B1 | 6/2001 | Stuart et al. |
| 6,456,709 B1 | 9/2002 | Cox et al. |
| 6,990,189 B2 | 1/2006 | Ljubicich |
| 2005/0080632 A1* | 4/2005 | Endo et al. .................... 704/277 |
| 2007/0129054 A1* | 6/2007 | Andronikov et al. ....... 455/404.2 |
| 2008/0019496 A1* | 1/2008 | Taschereau ............... 379/218.01 |
| 2008/0071544 A1 | 3/2008 | Beaufays et al. |
| 2008/0097846 A1 | 4/2008 | Altberg et al. |
| 2012/0028649 A1* | 2/2012 | Gupta et al. ................ 455/456.1 |
| 2012/0302204 A1* | 11/2012 | Gupta et al. .................. 455/406 |
| 2013/0022188 A1* | 1/2013 | Padmanabhan et al. . 379/201.08 |
| 2013/0148790 A1* | 6/2013 | McGary et al. ................. 379/45 |

\* cited by examiner

*Primary Examiner* — Michael N Opsasnick

(57) ABSTRACT

Disclosed herein are systems, methods, and computer-readable storage media for a speech recognition application for directory assistance that is based on a user's spoken search query. The spoken search query is received by a portable device and portable device then determines its present location. Upon determining the location of the portable device, that information is incorporated into a local language model that is used to process the search query. Finally, the portable device outputs the results of the search query based on the local language model.

18 Claims, 4 Drawing Sheets

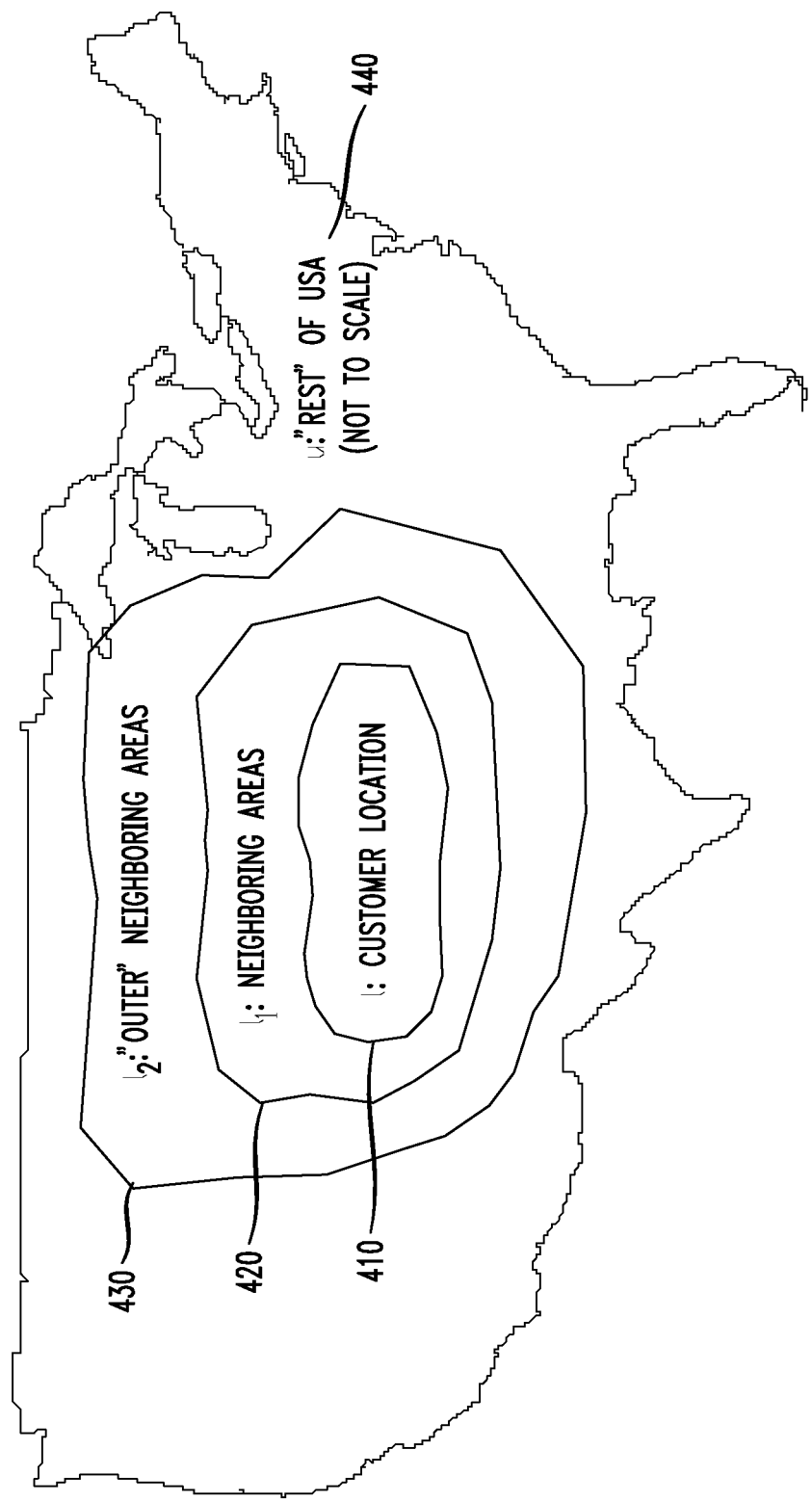

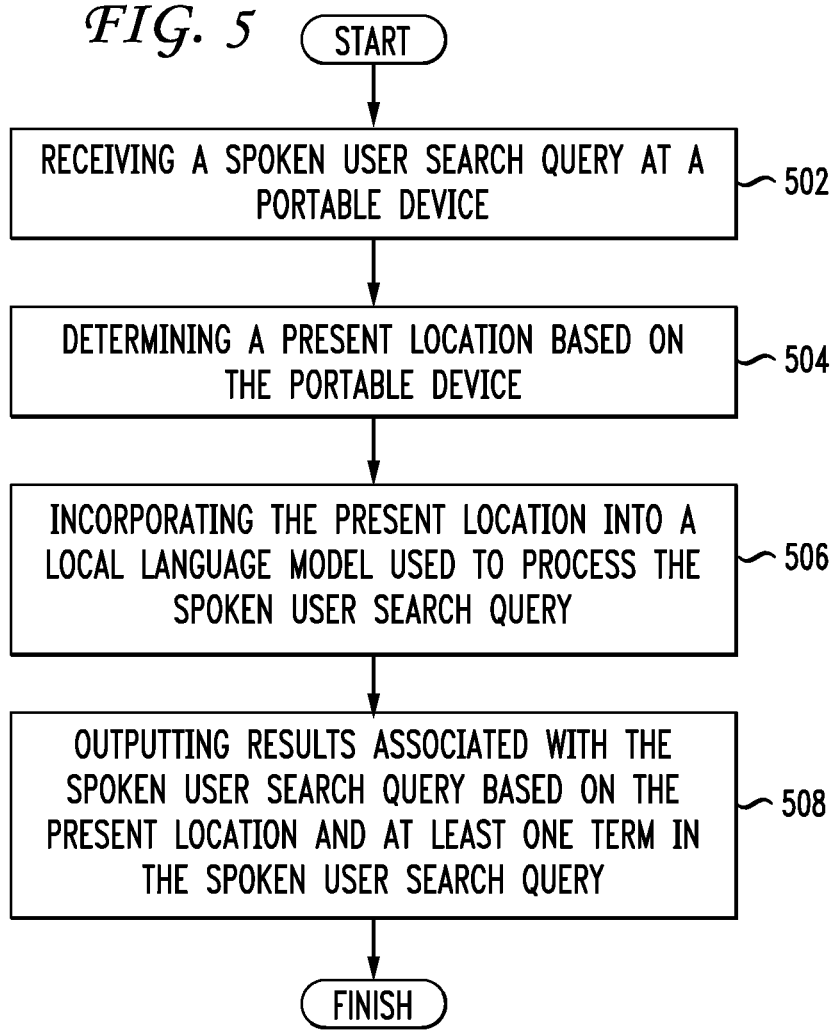

SYSTEM AND METHOD FOR COMBINING GEOGRAPHIC METADATA IN AUTOMATIC SPEECH RECOGNITION LANGUAGE AND ACOUSTIC MODELS

PRIORITY INFORMATION

The present application is a continuation of U.S. patent application Ser. No. 13/638,667, now U.S. Pat. No. 8,892,443, filed Dec. 15, 2009, the content of which is incorporated herein by reference in its entirety.

BACKGROUND

1. Technical Field

The present disclosure relates to automatic speech recognition and more specifically to search queries based on automatic speech recognition that use local models to determine the results of a search query.

2. Introduction

In the speech recognition applications of directory assistance (DA) and voice-search, the query distribution often depends on the customer's location, but current approaches do not adequately reflect this. Further, some approaches which attempt to address this issue are insufficiently "granular" and flexible for the recognition of city-state and/or for the recognition of business listings in a nation-wide voice-search service.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example geographical distribution of locations used in determining probabilities for the local model; and FIG. 5 illustrates an example method embodiment of the present disclosure.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
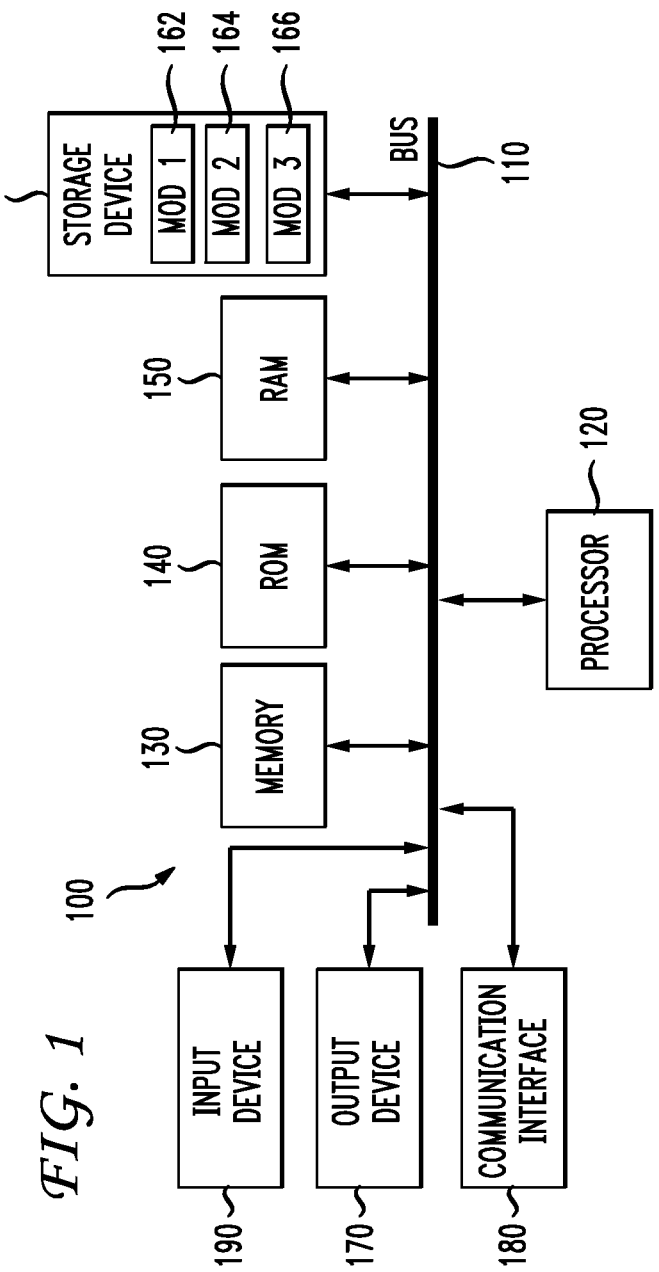
FIG. 1 illustrates an example of the components of the system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
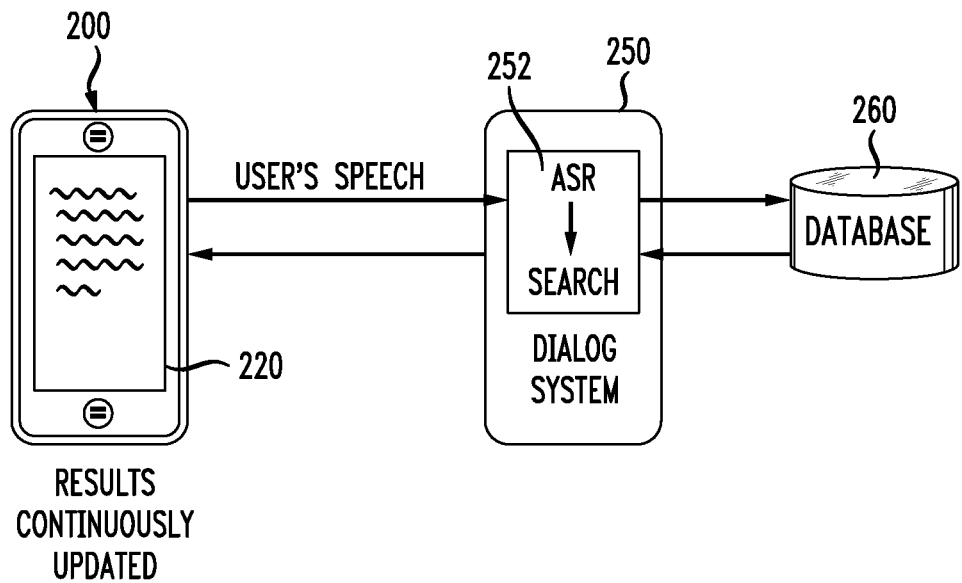
FIG. 2 illustrates an example of a system embodiment.

FIG. 2 illustrates one exemplary embodiment of the system of the present disclosure. The system can include a multimodal portable device 200 that accepts a user's speech. The multimodal device transmits the user's speech to a dialog system 250 where an automatic speech recognition unit 252 recognizes the speech and creates the search terms that are forwarded to the database 260. The database 260 returns matches based on the search query to the dialog system 250 which in turn communicates results from the search to the multimodal device. It is not necessary for the dialog system and the database to be separate from the multimodal device 200, as they are depicted in FIG. 2, but rather can either be integrated with the multimodal device, have three separate modules, or any practical combination of integration that follows this spirit and scope of this disclosure.

Figure 3:
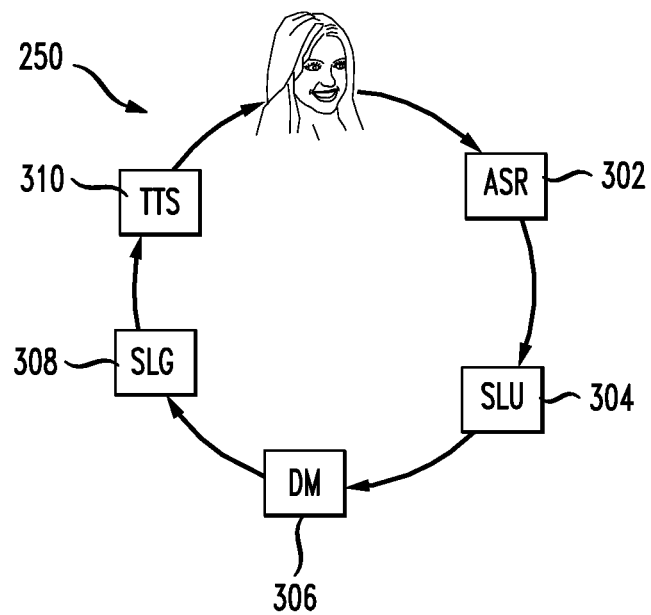
FIG. 3 illustrates an example of a spoken dialog system.

Multimodal device 200 can be any device that allows for multiple types of inputs and that can transmit voice and data, including a voice signal as data. One common example of a multimodal device is a typical cellular telephone that can connect to data networks as well as portable computers that can carry voice and data as well. The dialog system 250 is any system or module that can translate a user's speech into a digital signal. An embodiment that can operate to satisfy the dialog system 250 is shown in FIG. 3, and represents a typical spoken dialog system. However, while all components shown in FIG. 3 are available for use with the system shown in FIG. 2, not all embodiments will require the use of all the described components. To further clarify this point, without limiting the set up of any embodiment, it is possible for the modules shown in FIG. 3, to be broken up into different locations, where for instance a multimodal device 200 can have a synthesizer to output generated speech. Therefore, the modules in FIG. 3 can be included or excluded in any embodiment and the modules can be in any location of the system shown in FIG. 2 if they are included.

Spoken dialog systems aim to identify intents of humans, expressed in natural language, and take actions accordingly, to satisfy their requests. FIG. 3 is a functional block diagram of an exemplary natural language spoken dialog system 250. Natural language spoken dialog system 300 may include an automatic speech recognition (ASR) module 302, a spoken language understanding (SLU) module 304, a dialog management (DM) module 306, a spoken language generation (SLG) module 308, and a synthesizer module 310. The synthesizer module may be any type of speech output module. For example, it may be a module wherein one of a plurality of prerecorded speech segments is selected and played to a user. Thus, the synthesizer module represents any type of speech output.

ASR module 302 may analyze speech input and may provide a transcription of the speech input as output. SLU module 304 may receive the transcribed input and may use a natural language understanding model to analyze the group of words that are included in the transcribed input to derive a meaning from the input. The role of DM module 306 is to interact in a natural way and help the user to achieve the task that the system is designed to support. DM module 306 may receive the meaning of the speech input from SLU module 304 and may determine an action, such as, for example, providing a response, based on the input. SLG module 308 may generate a transcription of one or more words in response to the action provided by DM 306. Synthesizer module 310 may receive the transcription as input and may provide generated audible speech as output based on the transcribed speech.

Thus, the modules of system 250 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 250, which the user then hears. In this manner, the user can carry on a natural language dialog with system 250. Those of ordinary skill in the art will understand the programming languages and means for generating and training ASR module 102 or any of the other modules in the spoken dialog system. Further, the modules of system 250 may operate independent of a full dialog system. For example, a computing device such as a smart phone (or any processing device having a phone capability) may have an ASR module wherein a user may say "call mom" and the smart phone may act on the instruction without a "spoken dialog."

FIG. 2 discloses one embodiment of the present disclosure. The system initially receives a spoken user search query and communicates that query to the dialog system. An ASR module within that system can be trained to use models that are based on the user's present location instead of or in conjunction with global models. The local models that incorporate the location of the portable device can increase accuracy due to the ASR module running a model that takes into account a user's location. Specifically, the modules are conditioned to run local models thereby offering the user results based on nearby addresses and local businesses rather than a just global search that is not constrained by the specific location of the user. Therefore, the ASR can be trained to use a local model that uses the user location l along with the user query x, to form the model that as a general rule can be modeled based on the probability function of the form p(x|l). This improves the accuracy over a global model that is not based on user location l.

Two embodiments of the present disclosure are described below, but the disclosure is in no way limited by providing exemplary embodiments. In one embodiment of the present disclosure the model used by the ASR will be a city-state model, and in another embodiment the model will be a voice-search model. The models are designed using mixtures of probability distribution functions, one representation of an appropriate function is detailed below:

$$p(x|l) = wlpl(x) + wl_1pl_1(x) + wl_2pl_2(x) + w_u p_u(x)$$

Within this function, the terms that are used include the location of the user l with concentric circles expanding to $l_1$ and $l_2$ out to the largest area used in the function u. Next, the function includes w, which represents the weight. The weights are to be interpreted as the probabilities that someone located in l asks for any item in l and the topologically concentric location $l_1$, $l_2$, and u. Finally, the probabilities of items within the concentric locations are denoted by pl(x), $pl_1(x)$, $pl_2(x)$, and pu(x). It should be noted that this is merely an exemplary embodiment and the number of concentric circles that are used for the model can depend largely on data sets available and the choices of the model designers as they weigh the costs of processing the data versus more accurate results. In one embodiment, as shown in FIG. 4, the model uses four concentric circles which represent locations from where the customer is currently located l 410, to the second concentric circle that encompasses neighboring areas $l_1$ 420, the third concentric circle encompasses the outer neighboring areas $l_2$ 430, and then the fourth concentric circle is the entire United States u 440. However, it should be noted that this is merely one embodiment of the present disclosure, and that any geometric shape that has an area can be used.

Specifically, one embodiment uses an ASR module that has the city-state model and uses area codes as a proxy for location l. This model approximates that the area code of the phone that is being used is the location of the portable device. There are a number of different ways to set up the probabilities of this type of model, some of the possibilities that are in conformance with this disclosure follow, but are in no way limiting. One such possibility is that the first component probability pl(x) is of the cities within the area-code of the user's cell phone, the second component probability $pl_1(x)$ is of cities in the other area codes of the same state, and then pu(x) is of cities in the rest of the US. In this embodiment there are only three components; the fourth is missing. A second possibility for this model would use an area code adjacency matrix to define the components in the probability equation listed above. Using this model, the first component probability pl(x) is of the cities in the area code of the user's portable device, the second component probability $pl_1(x)$ is of the cities in the area-codes adjacent to the area code containing the user's portable device, the third component probability $pl_2(x)$ is of the cities in the area-codes adjacent to the area codes used as the second component, and the fourth component pu(x) is of the cities in the rest of the United States. In one aspect, components include not only adjacent regions. The system can include frequently visited locations based on a user profile, for example. If a user frequently flies between San Francisco, Houston, West Palm Beach, and Washington, D.C., that user's profile can indicate that a local model includes area codes for those locales in anticipation of a high likelihood of the user visiting those cities in the near future. Frequently visited locations can be in place of or in combination with nearby locations in an ASR model.

To implement one embodiment of a model actually used in system 200 is for the combination of a global model and a local model to improve the overall accuracy of the system. In this embodiment the global model is estimated to have the probabilities of cities in a certain area proportional to the business counts. The global model is then combined using interpolation with a local model. The weights used in the probability distribution function are then estimated empirically from data collected related to user searches. The combination of local and global models can provide for a decreasing perplexity and an increase in City-State accuracy over just the global models.

Another embodiment of the present disclosure uses a voice-search model as a local model and the global model with which it is combined is the same as described above. One embodiment that conforms to the present disclosure involves the use of 3-gram language models based on the web queries for a particular city. The language models are trained on a database of queries, for instance anonymous typed queries from the logs of yellowpages.com that include location and search terms. Trained from this database, the model for the city will be chosen based on the longitude and latitude given by a GPS system within the portable device. Another embodiment uses a local model that is built from the same database, but is instead based on the state in which the portable device is located. Finally, a third local model is based on the cities that are contained in the area code of the portable device, along with the cities in the adjacent area-codes as described above for use with the probability distribution equation. However, the last component, pu(x) is left off in this particular model, and the interpolation weights, wl, $wl_1$, and $wl_2$, are estimated by optimizing the perplexity of queries from the respective area code.

The embodiments that use the voice search models use a combination of local and global models that are created using a union or interpolation between the local and global models. In one embodiment, a union of the two models is used to facilitate dynamically building the models for each utterance, however, this can also be achieved using interpolation. The equation that represents the union between the local and global models is shown below:

$$p(x) = \frac{\max[pl(x), pg(x)]}{\Sigma_y \max[pl(y), pg(y)]}$$

The ASR can use any of the above described embodiments as models to complete the search of the database and return answers the user's queries. These models are used to refine a user query by identifying local results based on an ambiguous or vague query. For example, an ASR system can use a model that conforms to the present disclosure to differentiate between a user asking for Norristown, which is located in Pennsylvania, and Morristown, which is located in New Jersey, based on the location of the device. Furthermore, a model that conforms to the present disclosure could distinguish an ambiguous or vague businesses query based on the user location. As another example, "Giant" is a popular grocery store in the Mid-Atlantic region of the United States and "Giant Eagle" is a popular grocery store in the Mid-West portion of the United States, so when a user in Cleveland, Ohio, says "find Giant Grocery Store" the local model would be able to discern that due to the location the user actually wants a Giant Eagle grocery store and would forward the appropriate search query for use by a database. Therefore, the entire system 200 operates using at least a local model within the speech recognition framework.

Training program that runs on the ASR is also within the scope of the present disclosure. While it can be trained on pre-existing databases, it can also be trained on user query data as well. This training comes from analyzing the inputs from portable devices and assigning location information to the queries based on both the location of the devices as well as any location information that is used in the query. The actual inputs into the portable devices may be from verbal inputs from the user or textual inputs, such as web queries that are typed into a web page. The data from these queries can be aggregated and analyzed to form the basis used to train the models used in the embodiments that are a part of this disclosure. Another way that an embodiment of the present disclosure can use the data is that it can be divided into geographical areas based on the density of the business that are associated within that area. The system can categorize the data into regions, like Mid-West and Mid-Atlantic, as previously described, or refine them down to a state level area, or further into a city level area. Regardless of whether a coarse, i.e., Mid-West, area is used or a finer measurement, i.e., city, is used, this allows the program to estimate a local model at different granularities or areas and therefore provide higher accuracy than using only a national model.

Another aspect of the present disclosure is the use of local acoustic models to refine the searches used with a spoken user query. Acoustic models can be used separate from or incorporated with the local language models that were previously described in this disclosure. Therefore, one way that the local models within this disclosure can be used is to add acoustic models to the language models. Acoustic models are used to further refine the area from which a user is making the query based on the dialectal variations of the language used. For example, if American English is being spoken, then the system can train an acoustical model from data that is partitioned into regions due to dialect variations that indicate a specific area of the country. One example is a southern accent will typically indicate the speaker is in a southern area and will therefore allow the system to increase the accuracy with which it identifies query terms. Therefore, roughly speaking there can be regions such as "southern", "northern", "midwest", "west", and "east". Further, refinement is also possible depending on the data used and the variations in dialect that are possible to discern. For instance, an HMM designed to recognize regional dialect can be adapted to the data used in the city-state model embodiment described above to further refine the accuracy of the terms used in a query.

Having disclosed some basic system components and exemplary embodiments, the disclosure now turns to the exemplary method embodiment shown in FIG. 5. For the sake of clarity, the method is discussed in terms of an exemplary system 100 such as is shown in FIG. 1 configured to practice the method. A system 100 receives a spoken user search query at a portable device (510). Then the system 100 determines a present location based on the portable device (520). After the present location is determined the system 100 incorporates the present location into a local language model used to process the spoken user search query (530). Finally, the system 100 outputs results associated with the spoken user search query based on the present location and at least one term in the spoken user search query (540).

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be combined with less general interfaces to allow a more vertical search designed to take better advantage of application constraints. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving a spoken query at a portable device;
determining a present location of the portable device;
incorporating a granularity description of the present location into a local language model, the granularity description using topologically concentric locations to determine weights, wherein the weights are used to determine probabilities;
combining the local language model with a global language model according to the weights, to yield a combined language model; and
outputting, using the combined language model, results associated with the spoken query based on the present location and a term in the spoken user search query.

2. The method of claim 1, wherein the granularity description uses business density to determine the weights.

3. The method of claim 1, further comprising processing the spoken query using the local language model, to yield the results, wherein the local language model comprises the granularity description.

4. The method of claim 1, further comprising:
incorporating the present location into a local acoustic model used to process the spoken user query.

5. The method of claim 1 wherein the present location of the portable device is determined using one of a global positioning system, triangulation, and automatic number identification.

6. The method of claim 1, wherein incorporating of the granularity description into the language model further comprises:
partitioning training data into geographical areas;
estimating models for each partition; and
selecting a portioned model based on the location of the portable device.

7. The method of claim 6, further comprising generating a user model by combining two models using interpolation.

8. The method of claim 1, wherein entities in the local language model are related at one of a city, an area code, and a state level.

9. A system comprising:
a processor; and
a computer-readable storage medium having instructions stored which, when executed by the processor, result in operations comprising:
receiving a spoken query at a portable device;
determining a present location of the portable device;
incorporating a granularity description of the present location into a local language model, the granularity description using topologically concentric locations to determine weights, wherein the weights are used to determine probabilities;
combining the local language model with a global language model according to the weights, to yield a combined language model; and
outputting, using the combined language model, results associated with the spoken query based on the present location and a term in the spoken user search query.

10. The system of claim 9, wherein the granularity description uses business density to determine the weights.

11. The system of claim 9, the computer-readable storage medium having additional instructions stored which, when executed by the processor, result in operations comprising processing the spoken query using the local language model, to yield the results, wherein the local language model comprises the granularity description.

12. The system of claim 9, the computer-readable storage medium having additional instructions stored which, when executed by the processor, result in operations comprising:
incorporating the present location into a local acoustic model used to process the spoken user query.

13. The system of claim 9, wherein the present location of the portable device is determined using one of a global positioning system, triangulation, and automatic number identification.

14. The system of claim 9, wherein incorporating of the granularity description into the language model further comprises:
partitioning training data into geographical areas;
estimating models for each partition; and
selecting a portioned model based on the location of the portable device.

15. The system of claim 14, the computer-readable storage medium having additional instructions stored which, when executed by the processor, result in operations comprising generating a user model by combining two models using interpolation.

16. The system of claim 9, wherein entities in the local language model are related at one of a city, an area code, and a state level.

17. A computer-readable storage device having instructions stored which, when executed by a computing device, result in operations comprising:
receiving a spoken query at a portable device;
determining a present location of the portable device;
incorporating a granularity description of the present location into a local language model, the granularity description using topologically concentric locations to determine weights, wherein the weights are used to determine probabilities;
combining the local language model with a global language model according to the weights, to yield a combined language model; and
outputting, using the combined language model, results associated with the spoken query based on the present location and a term in the spoken user search query.

18. The computer-readable storage device of claim 17, wherein the granularity description uses topologically concentric locations to determine the weights.

* * * * *